US010248557B1

United States Patent
James et al.

(10) Patent No.: US 10,248,557 B1
(45) Date of Patent: Apr. 2, 2019

(54) SYSTEMS AND METHODS FOR DELAYED ALLOCATION IN CLUSTER STORAGE

(71) Applicant: Veritas Technologies LLC, Mountain View, CA (US)

(72) Inventors: Freddy James, Kerela (IN); Rachit Chadha, Punjab (IN); Brad Boyer, San Jose, CA (US); Edwin Menze, Portland, OR (US); Ajay Salpekar, Hayward, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 224 days.

(21) Appl. No.: 15/266,251

(22) Filed: Sep. 15, 2016

(51) Int. Cl.
- *G06F 12/00* (2006.01)
- *G06F 12/02* (2006.01)
- *G06F 3/06* (2006.01)

(52) U.S. Cl.
CPC ............ *G06F 12/023* (2013.01); *G06F 3/061* (2013.01); *G06F 3/067* (2013.01); *G06F 3/0631* (2013.01); *G06F 3/0644* (2013.01); *G06F 2212/1016* (2013.01); *G06F 2212/154* (2013.01); *G06F 2212/261* (2013.01); *G06F 2212/263* (2013.01)

(58) Field of Classification Search
CPC .... G06F 12/023; G06F 3/0644; G06F 3/0631; G06F 3/061; G06F 3/067; G06F 2212/263; G06F 2212/261; G06F 2212/154; G06F 2212/1016
See application file for complete search history.

(56) References Cited

U.S. PATENT DOCUMENTS

| 5,642,501 | A  | * | 6/1997  | Doshi    | G06F 17/30067 707/613 |
| 7,702,873 | B2 | * | 4/2010  | Griess   | G06F 3/0608 711/100 |
| 7,945,726 | B2 | * | 5/2011  | Faibish  | G06F 3/061 711/112 |
| 8,392,479 | B1 | * | 3/2013  | Pantin   | G06F 17/3007 707/823 |
| 8,874,850 | B1 | * | 10/2014 | Goodson  | G06F 12/0875 711/133 |
| 9,916,095 | B2 | * | 3/2018  | Stabrawa | G06F 3/0605 |
| 2006/0242382 | A1 | * | 10/2006 | Griess | G06F 3/0608 711/170 |
| 2010/0174879 | A1 | * | 7/2010 | Pawar    | G06F 3/0608 711/161 |

\* cited by examiner

*Primary Examiner* — Francisco A Grullon
(74) *Attorney, Agent, or Firm* — FisherBroyles, LLP (57) ABSTRACT

The disclosed computer-implemented method for delayed allocation in cluster storage may include (i) delegating, to a node attached to a storage cluster including one or more storage devices that include a group of allocation units, a subset of allocation units on the storage cluster to be held as a delayed allocation pool, (ii) receiving, from the node, a request to allocate allocation units on the storage cluster, (iii) deducting the number of allocation units from available allocation units in the delayed allocation pool, (iv) satisfying the allocation request by allocating allocation units not in the delayed allocation pool before allocating allocation units included in the delayed allocation pool, and (v) recalculating, based on the number of allocation units in the delayed allocation pool used to satisfy the allocation request, the number of available allocation units in the delayed allocation pool. Various other methods, systems, and computer-readable media are also disclosed.

20 Claims, 4 Drawing Sheets

SYSTEMS AND METHODS FOR DELAYED ALLOCATION IN CLUSTER STORAGE

BACKGROUND

Delayed allocation has been a feature of computer file systems for several years. With delayed allocation, pending disk writes are held in memory and disk space to be allocated for the additional writes is subtracted from a free-space counter. Disk writes may be cached in memory until memory must be freed for other purposes or until the operating system or an application determines it is necessary to flush the cache to disk. Delayed allocation may increase the performance of a file system by replacing slow disk write operations with relatively fast writes to cache. Disk writes may be delayed until periods of low system utilization, and consolidating several cache writes into one large disk write may enable the storage device to optimize file storage for later retrieval.

The advantages of delayed allocation when used with direct attached storage, however, have not been fully realized with cluster storage systems. With cluster storage, several computing devices may share several storage devices. The storage cluster may appear to be a single file system to applications, but the storage system may transparently manage delegation of storage to computing devices, and caching, allocating, and writing data to storage devices. The complexity of managing cluster storage relative to the time needed to write data to storage devices may reduce the performance gains of delayed allocation in cluster storage systems. For example, a cluster storage system that implements delayed allocation by reserving delayed allocation blocks in delegated storage maps may realize little performance gain from the use of delayed allocation. The instant disclosure, therefore, identifies and addresses a need for systems and methods for delayed allocation in cluster storage.

SUMMARY

As will be described in greater detail below, the instant disclosure describes various systems and methods for delayed allocation in cluster storage by delegating allocation units on a storage cluster to a node attached to the storage cluster as a delayed allocation pool. As the node requests allocation units on the storage cluster, the systems and methods described may herein satisfy allocation requests with allocation units not in the delayed allocation pool before using the delayed allocation pool.

In one example, a computer-implemented method for delayed allocation in cluster storage may include (i) delegating, to a node attached to a storage cluster including one or more storage devices that include a group of allocation units, a subset of the allocation units on the storage cluster to be held as a delayed allocation pool, (ii) receiving, from the node, a request to allocate a number of allocation units on the storage cluster, (iii) deducting the number of allocation units from a number of available allocation units in the delayed allocation pool, (iv) satisfying the allocation request by allocating allocation units not included in the delayed allocation pool before allocating allocation units included in the delayed allocation pool, and (v) recalculating, based on the number of allocation units in the delayed allocation pool used to satisfy the allocation request, the number of available allocation units in the delayed allocation pool.

In one embodiment, the computer-implemented method may further include determining that the number of available allocation units in the delayed allocation pool is below a threshold and in response to determining that the number of available allocation units in the delayed allocation pool is below a threshold, replenishing the delayed allocation pool by delegating additional allocation units on the storage cluster to the delayed allocation pool. In one embodiment, the computer-implemented method may further include (i) determining that the number of available allocation units in the delayed allocation pool is below a threshold, (ii) determining that the number of available allocation units on the storage cluster is below an available unit threshold, and (iii) in response to determining that the number of available allocation units on the storage cluster is below the available unit threshold, (a) identifying at least one additional node attached to the storage cluster with allocation units on the storage cluster delegated to the additional node, (b) revoking the delegation of a subset of the allocation units delegated to the additional node, and (c) delegating the subset of allocation units to the delayed allocation pool.

In one embodiment, the computer-implemented method may further include (i) determining that the number of available allocation units in the delayed allocation pool is below a threshold, (ii) determining that the number of available allocation units on the storage cluster is below an available unit threshold, and (iii) in response to determining that the number of available allocation units on the storage cluster is below the available unit threshold, reporting that additional allocation units cannot be delegated to the delayed allocation pool. In one embodiment, the allocation units are delegated to be held as the delayed allocation pool in response to a file system mount event, a node join event, and/or a first delayed allocation event. In one embodiment, the number of allocation units in the delayed allocation pool is determined at least in part by the number of available allocation units in the storage cluster.

In one embodiment, the computer-implemented method may further include (i) maintaining, for the node, a measurement of a rate at which the node requests allocation units on the storage cluster, (ii) comparing the allocation request rate for the node to the number of allocation units held in the delayed allocation pool, and (iii) adjusting the number of allocation units in the delayed allocation pool by delegating additional allocation units to the delayed allocation pool or relinquishing a delegation of allocation units to the delayed allocation pool, based at least in part on (a) a rate of allocation of allocation units in the delayed allocation pool, (b) a ratio of the node's allocation request rate to an allocation request rate for at least one additional node attached to the storage cluster, (c) a ratio of the node's allocation request rate to a number of allocation units allocated to the node, but not in the delayed allocation pool, and (d) a ratio of the node's allocation request rate to a number of available allocation units on the storage cluster.

In one embodiment, the allocation request is satisfied by allocating allocation units delegated to the node, but not included in the delayed allocation pool. In one embodiment, the delegation of allocation units to the delayed allocation pool is made from a process executing at a lower priority than a priority of a process servicing allocation requests from the node.

In one embodiment, a system for implementing the above-described method may include several modules stored in memory, such as (i) a delegation module that delegates, to a node attached to a storage cluster including one or more storage devices that include a group of allocation units, a subset of the allocation units on the storage cluster to be held as a delayed allocation pool, (ii) a communication module that receives, from the node, a request to allocate a number of allocation units on the storage cluster, (iii) an adjustment module that deducts the number of allocation units from a number of available allocation units in the delayed allocation pool, (iv) an allocation module that satisfies the allocation request by allocating allocation units not included in the delayed allocation pool before allocating allocation units included in the delayed allocation pool, and/or (v) an adjustment module that recalculates, based on the number of allocation units in the delayed allocation pool used to satisfy the allocation request, the number of available allocation units in the delayed allocation pool. The system may also include at least one physical processor configured to execute the delegation module, the communication module, the adjustment module, and the allocation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) delegate, to a node attached to a storage cluster including one or more storage devices that include a group of allocation units, a subset of the allocation units on the storage cluster to be held as a delayed allocation pool, (ii) receive, from the node, a request to allocate a number of allocation units on the storage cluster, (iii) deduct the number of allocation units from a number of available allocation units in the delayed allocation pool, (iv) satisfy the allocation request by allocating allocation units not included in the delayed allocation pool before allocating allocation units included in the delayed allocation pool, and (v) recalculate, based on the number of allocation units in the delayed allocation pool used to satisfy the allocation request, the number of available allocation units in the delayed allocation pool.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for delayed allocation in cluster storage. As will be explained in greater detail below, the various systems and methods described herein may delegate allocation units to a delayed allocation pool for a node and satisfy allocation requests by prioritizing allocation from outside the delayed allocation pool before allocating from the delayed allocation pool. By holding the delayed allocation pool in reserve, the systems and methods described herein may satisfy allocation requests while reducing the need to seek additional delegations, thereby reducing the performance overhead associated with delayed allocation and improving the functioning and performance of cluster storage systems.

Figure 1:
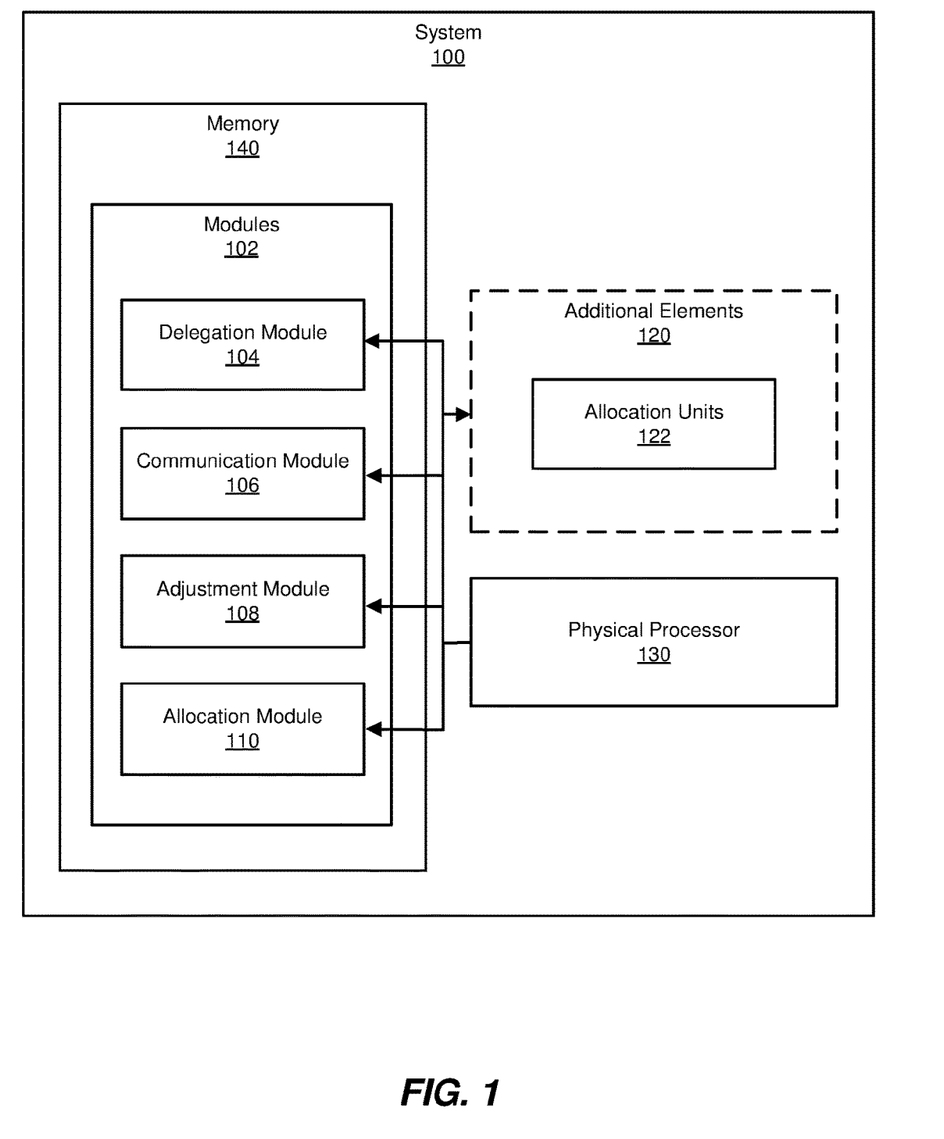
FIG. 1 is a block diagram of an example system for delayed allocation in cluster storage.
Figure 2:
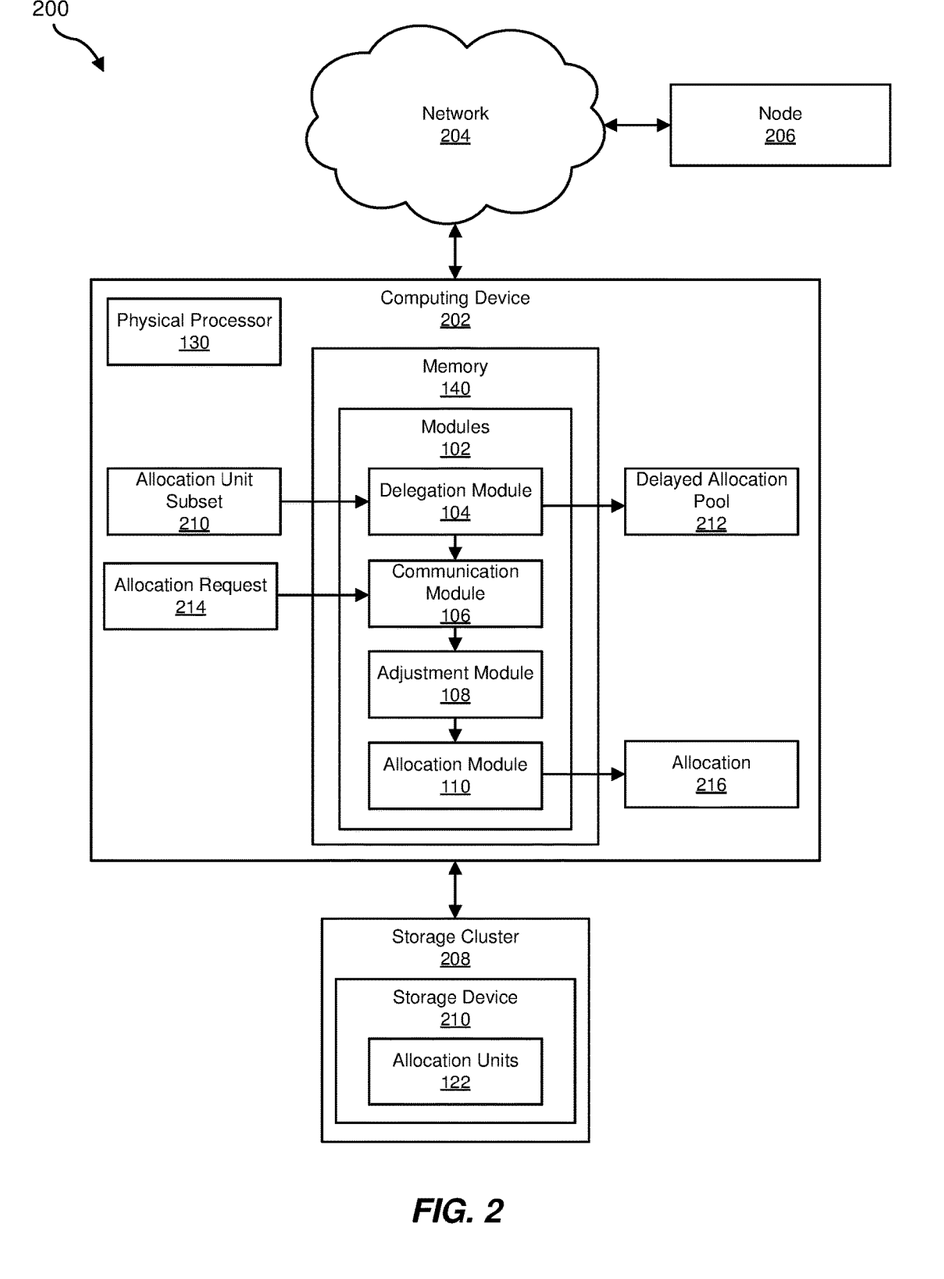
FIG. 2 is a block diagram of an additional example system for delayed allocation in cluster storage.

The following will provide, with reference to FIGS. 1-2, detailed descriptions of example systems for delayed allocation in cluster storage. Detailed descriptions of corresponding computer-implemented methods will also be provided in connection with FIGS. 3 and 4.

FIG. 1 is a block diagram of an example system 100 for delayed allocation in cluster storage. As illustrated in this figure, exemplary system 100 may include one or more modules 102 for performing one or more tasks. For example, and as will be explained in greater detail below, exemplary system 100 may include a delegation module 104 that delegates, to a node attached to a storage cluster that includes one or more storage devices that include a group of allocation units, a subset of the allocation units on the storage cluster to be held as a delayed allocation pool. Exemplary system 100 may additionally include a communication module 106 that receives, from the node, a request to allocate a number of allocation units on the storage cluster. Exemplary system 100 may also include an adjustment module 108 that deducts the number of allocation units from a number of available allocation units in the delayed allocation pool. Exemplary system 100 may additionally include an allocation module 110 that satisfies the allocation request by allocating allocation units not included in the delayed allocation pool before allocating allocation units included in the delayed allocation pool. Adjustment module 108 may also recalculate, based on the number of allocation units in the delayed allocation pool used to satisfy the allocation request, the number of available allocation units in the delayed allocation pool. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, node 206 and/or storage cluster 208). One or more of modules 102 in FIG. 1 may also represent all or portions of one or more special-purpose computers configured to perform one or more tasks.

As illustrated in FIG. 1, example system 100 may also include one or more memory devices, such as memory 140.

Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate delayed allocation in cluster storage. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include a group of allocation units 128. Allocation units 128 generally represent any type or form of storage segments that may be allocated for storing data. Examples of allocation units 128 may include, without limitation, disk sectors, data clusters, data blocks, and/or records.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a node 206 via a network 204. In one example, all or a portion of the functionality of modules 102 may be performed by computing device 202, node 206, and/or any other suitable computing system. As will be described in greater detail below, one or more of modules 102 from FIG. 1 may, when executed by at least one processor of computing device 202 and/or node 206, enable computing device 202 and/or node 206 to perform delayed allocation in a storage cluster. For example, and as will be described in greater detail below, delegation module 104 may delegate, to a node 206 attached to a storage cluster 208 comprising at least one storage device 210 that comprises a plurality of allocation units 122, a subset of allocation units 122 on storage cluster 208 to be held as a delayed allocation pool 212. Communication module 106 may receive, from node 206, a request to allocate a number of allocation units 122 on storage cluster 208. Adjustment module 108 may deduct the number of allocation units 122 from a number of available allocation units 122 in delayed allocation pool 212. Allocation module 110 may satisfy allocation request 214 by allocating, as allocation 216, allocation units 122 not included in delayed allocation pool 212 before allocating allocation units 122 included in delayed allocation pool 212. Adjustment module 108 may recalculate, based on the number of allocation units 122 in delayed allocation pool 212 used to satisfy allocation request 214, the number of available allocation units 122 in delayed allocation pool 212.

Computing device 202 and node 206 generally represent any type or form of computing device capable of reading computer-executable instructions. Computing device 202 may represent a switch or controller for a storage cluster. Additional examples of computing device 202 and node 206 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, or any other suitable computing device.

Network 204 generally represents any medium or architecture capable of facilitating communication or data transfer. In one example, network 204 may facilitate communication between computing device 202 and node 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Storage cluster 208 generally represents any type or form of storage group that includes one or more storage devices 210 and is configured to appear to computing devices as a locally attached storage device. Examples of storage cluster 208 include, without limitation, storage area networks (SANS) and disk arrays.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
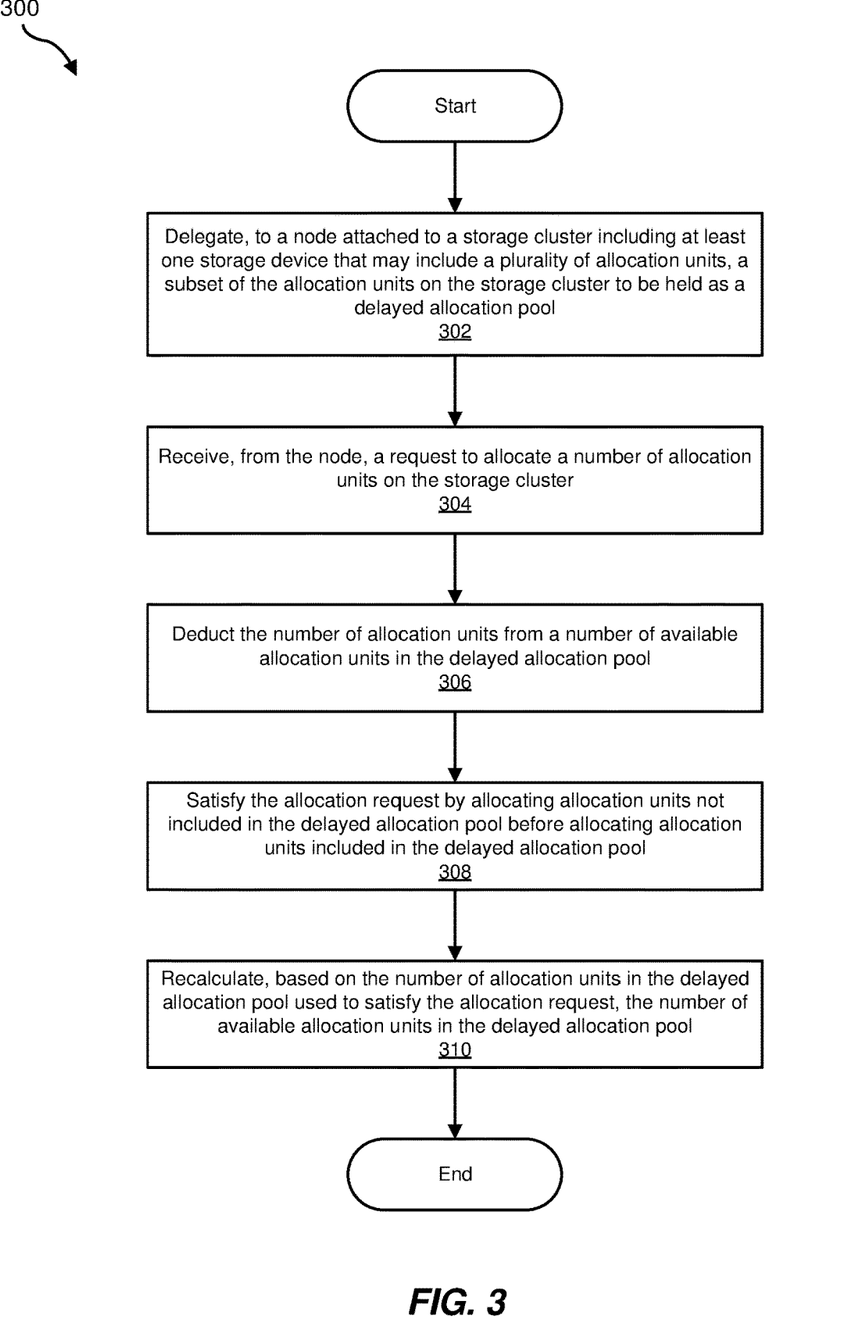
FIG. 3 is a flow diagram of an example method for delayed allocation in cluster storage.

FIG. 3 is a flow diagram of an example computer-implemented method 300 for delayed allocation in cluster storage. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may delegate, to a node attached to a storage cluster including at least one storage device that may include a plurality of allocation units, a subset of the allocation units on the storage cluster to be held as a delayed allocation pool. For example, delegation module 104 may, as part of computing device 202 in FIG. 2, delegate, to node 206 attached to storage cluster 208 including at least one storage device 210 that may include a plurality of allocation units, a subset of allocation units 122 on storage cluster 208 to be held as delayed allocation pool 212.

The term "delegation," as used herein, generally refers to storage space on a storage cluster that is reserved for a node attached to the cluster. In addition, the term "allocation," as used herein, generally refers to the process of assigning data to storage blocks on a storage device. When a node saves a file on a storage cluster, the storage cluster may allocate storage space for the file from allocation units delegated to the node. The term "reservation," as used herein, generally refers to indicating allocation units to be allocated to satisfy an allocation request at a later time. In addition, the term "delayed allocation," as used herein, generally refers to an allocation made to satisfy a reservation.

Delegation module 104 may delegate allocation units on the storage cluster to a node in a variety of ways. For example, delegation module 104 may make an initial delegation for a node's delayed allocation pool based on the amount of available allocation units in the storage cluster. For example, delegation module 104 may delegate a percentage of the available allocation units to each node, keeping a portion of the available allocation units undelegated for use in later delegations. Because nodes with higher utilization may be expected to allocate storage at a higher rate than nodes that have allocated less storage, delegation module 104 may also base the number of allocation units delegated for a node's delayed allocation pool on the amount of storage already allocated to the node. In another example, delegation module 104 may not make an initial delegation to a node's delayed allocation pool, instead waiting until the node makes a first delayed allocation.

Delegation module 104 may delegate allocation units to a node's delayed allocation pool at various times. As just mentioned, an initial delegation to a node's delayed allocation pool may occur when the node makes a delayed allocation. In other examples, delegation module 104 may delegate allocation units to a node's delayed allocation pool when the node mounts a file system to the storage cluster, and/or when a node joins the storage cluster.

At step 304, one or more of the systems described herein may receive, from the node, a request to allocate a number of allocation units on the storage cluster. For example, communication module 106 may, as part of computing device 202 in FIG. 2, receive, from node 206, a request to allocate a number of allocation units 122 on storage cluster 208.

Communication module 106 may receive an allocation request from a node in a variety of ways. For example, a node may request allocation of a specific number of allocation units for writing a file to the storage cluster. In another example, a node may create a new file for writing data with no information on the eventual size of the file, relying on the storage cluster to estimate the size of an initial allocation for the file.

At step 306, one or more of the systems described herein may deduct the number of allocation units from a number of available allocation units in the delayed allocation pool. For example, adjustment module 108 may, as part of computing device 202 in FIG. 2, deduct the number of allocation units 122 from a number of available allocation units 122 in delayed allocation pool 212.

Adjustment module 108 may take a variety of approaches in maintaining the number of allocation units in the delayed allocation pool. For example, adjustment module 108 may simply deduct the number of allocation units needed to satisfy allocation request 214 from node 206 from the number of allocation units in delayed allocation pool 212, with the expectation that if allocation module 110 is able to satisfy allocation request 214 without reserving allocation units from delayed allocation pool 212, that adjustment module may subsequently add the number of allocation units allocated by allocation module 110 to the number of allocation units in delayed allocation pool 212. In another example, adjustment module 108 may determine whether allocation module 110 may be able to satisfy allocation request 214 without reserving allocation units from delayed allocation pool 212. If so, satisfying allocation request 214 may proceed without a need to adjust the size of delayed allocation pool 212 before or after allocation.

At step 308, one or more of the systems described herein may satisfy the allocation request by allocating allocation units not included in the delayed allocation pool before allocating allocation units included in the delayed allocation pool. For example, allocation module 110 may, as part of computing device 202 in FIG. 2, satisfy allocation request 214 by allocating, as allocation 216, allocation units 122 not included in delayed allocation pool 212 before allocating allocation units 122 included in delayed allocation pool 212.

Allocation module 110 may satisfy the allocation request in a variety of ways. For example, allocation module 110 may satisfy allocation request 214 by allocating allocation units 122 delegated to node 206, but not included in delayed allocation pool 212. If an insufficient number of allocation units 122 are available to satisfy allocation request 214 from allocation units not include in delayed allocation pool 212, allocation module 110 may satisfy allocation request 214 with a reservation from delayed allocation pool 212.

Allocation module 110 may determine that the number of available allocation units 122 in delayed allocation pool 212 is below a threshold. Allocations from delayed allocation pool 212 may have reduced the number of available allocation units 122, or storage cluster 208 may have received a request to revoke allocation units 122 delegated to node 206. In response to determining that the number of available allocation units 122 in delayed allocation pool 212 is below a threshold, one or more of the systems described herein may delegate additional allocation units 122 to delayed allocation pool 212.

Figure 4:
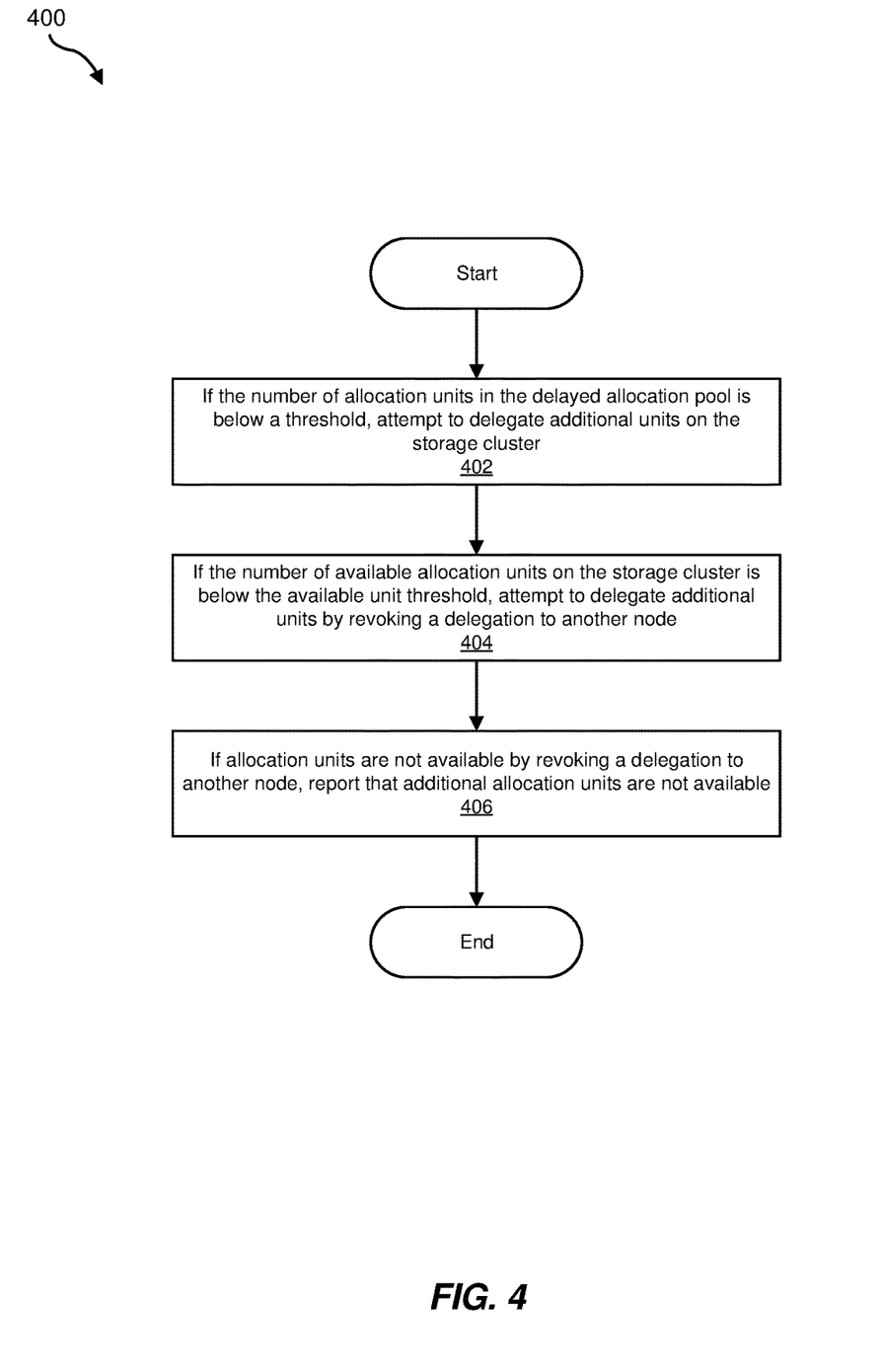
FIG. 4 is a flow diagram of an example method for delegating allocation units for delayed allocation in cluster storage.

FIG. 4 is an example method 400 for delegating allocation units for delayed allocation in cluster storage. The steps shown in FIG. 4 may be performed by any suitable computer-executable code and/or computing system, including system 100 in FIG. 1, system 200 in FIG. 2, and/or variations or combinations of one or more of the same.

As illustrated in FIG. 4, at step 402, one or more of the systems described herein may, in response to determining that the number of available allocation units in the delayed allocation pool is below a threshold, replenish the delayed allocation pool by delegating additional allocation units on the storage cluster to the delayed allocation pool. For example, allocation module 110 may, as part of computing device 202 in FIG. 2, replenish delayed allocation pool 212 by delegating additional allocation units 122 on storage cluster 208 to delayed allocation pool 212. For example, allocation module 110 may delegate available allocation units 122 not delegated to any node.

At step 404, one or more of the systems described herein may determine that the number of available allocation units on the storage cluster is below an available unit threshold, and in response to determining that the number of available allocation units on the storage cluster is below the available unit threshold, identify at least one additional node attached to the storage cluster with allocation units on the storage cluster delegated to the additional node, revoke the delegation of a subset of the allocation units delegated to the additional node, and delegate the subset of allocation units to the delayed allocation pool. For example, allocation module 110 may identify an additional node attached to storage cluster 208 and request that storage cluster 208 revoke a delegation of allocation units allocated to the additional node and re-delegate the allocation units to delayed allocation pool 212.

At step 406, one or more of the systems described herein may determine that the number of available allocation units on the storage cluster is below an available unit threshold, and in response to determining that the number of available allocation units on the storage cluster is below the available unit threshold, report that additional allocation units cannot be delegated to the delayed allocation pool. For example, allocation module 110 may determine that allocation units 122 are not available to be delegated to node 206 and that reservations to delayed allocation pool 212 must be completed.

In one embodiment, the delegation of allocation units to the delayed allocation pool is made from a process executing at a lower priority than a priority of a process servicing allocation requests from the node. For example, delegation module 104 or allocation module 110 may delegate allocation units 122 to delayed allocation pool 212 using a process executing at a lower priority than a process of allocation module 110 that satisfies allocation requests 214 from node 206. By executing the delegation process at a lower priority than the allocation process, systems described herein may increase the performance of delayed allocation relative to actual allocation.

Returning to FIG. 3, at step 310, one or more of the systems described herein may recalculate, based on the number of allocation units in the delayed allocation pool used to satisfy the allocation request, the number of available allocation units in the delayed allocation pool. For example, adjustment module 108 may, as part of computing device 202 in FIG. 2, recalculate, based on the number of allocation units 122 in delayed allocation pool 212 used to satisfy allocation request 214, the number of available allocation units 122 in delayed allocation pool 212.

Adjustment module 108 may take a variety of approaches in maintaining the number of allocation units in the delayed allocation pool. For example, as mentioned previously, adjustment module 108 may adjust the number of available allocation units in delayed allocation pool 212 by the number of allocation units reserved. In another example, adjustment module 108 may determine whether allocation 216 may be satisfied without reserving allocation units from delayed allocation pool 212 before determining whether to adjust the number of allocation units available in delayed allocation pool 212.

In one embodiment, the systems described herein may (i) maintain, for the node, a measurement of a rate at which the node requests allocation units on the storage cluster, (ii) compare the allocation request rate for the node to the number of allocation units held in the delayed allocation pool, and (iii) adjust the number of allocation units in the delayed allocation pool by delegating additional allocation units to the delayed allocation pool or relinquishing a delegation of allocation units to the delayed allocation pool. The size of the adjustment to the number of allocation units in the delayed allocation pool may be based at least in part on a rate of allocation of allocation units in the delayed allocation pool, a ratio of the node's allocation request rate to an allocation request rate for at least one additional node attached to the storage cluster, a ratio of the node's allocation request rate to a number of allocation units allocated to the node, but not in the delayed allocation pool, and/or a ratio of the node's allocation request rate to a number of available allocation units on the storage cluster.

For example, adjustment module 108 may compare the allocation rate for the node with the number of allocation units held in the delayed allocation pool and determine that additional allocation units should be delegated to the delayed allocation pool to assure that sufficient allocation units are available to allow delayed allocations for the node to continue. In another example, adjustment module 108 may determine that delayed allocation pool has an excessive number of allocation units for the allocation rate of the node, and that a delegation of allocation units to the delayed allocation pool can be relinquished for delegation to another node, thereby reducing the need for the other node to seek additional delegations at a later time. In this way, adjustment module 108 may compare the allocation request rate for the node to the allocation request rates for other nodes attached to the storage cluster to balance the size of delayed allocation pools for the attached nodes according to each node's allocation request rate.

As explained above in connection with FIGS. 1-4, the systems and methods described herein may make a special delegation of allocation units to be held as a delayed allocation pool. The delegation may be issued at file system mount, node join, first delayed allocation, or as needed to expand the delayed allocation pool. The described systems and methods may maintain a count of the number of allocation units as they satisfy allocation requests, prioritizing allocations from allocation units not in the delayed allocation pool before allocations from the delayed allocation pool. Nodes may make delayed allocation reservations against the count of allocation units in the delayed allocation pool. As the reservations (or delegation revoke requests) deplete the delayed allocation pool, the systems and methods described herein may complete reservations made against the delayed allocation pool or seek additional delegations to replenish the delayed allocation pool.

The systems and methods described herein may maintain a measure of the allocation rate for each node and increase delegation to the delayed allocation pool if the allocation rate indicates that the delayed reservation pool may become depleted. Delegations may be decreased or revoked to balance the size of delayed allocation pools for each node attached to the storage cluster, according to the allocation rates of each node. Because the systems and methods described herein satisfy allocation requests from allocation units outside the delayed allocation pool before allocating from the delayed allocation pool, the described systems and methods may not often need to adjust the size of the delayed allocation pool. Because the processes to adjust the size of the delayed allocation pool execute at a lower priority than allocation processes, the systems and methods described herein may have little impact on overall system performance.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for delayed allocation in cluster storage, at least a portion of the method being performed by a computing device comprising at least one processor, the method comprising:

delegating, to a node attached to a storage cluster comprising at least one storage device that comprises a plurality of allocation units, a subset of the allocation units on the storage cluster to be held as a delayed allocation pool;

receiving, from the node, a request to allocate a number of allocation units on the storage cluster;

deducting the number of allocation units from a number of available allocation units in the delayed allocation pool;

satisfying the allocation request by allocating allocation units not included in the delayed allocation pool before allocating allocation units included in the delayed allocation pool;

recalculating, based on the number of allocation units in the delayed allocation pool used to satisfy the allocation request, the number of available allocation units in the delayed allocation pool;

maintaining, for the node, a measurement of a rate at which the node requests allocation units on the storage cluster;

comparing the allocation request rate for the node to the number of allocation units held in the delayed allocation pool; and adjusting the number of allocation units in the delayed allocation pool by delegating additional allocation units to the delayed allocation pool or relinquishing a delegation of allocation units to the delayed allocation pool based at least in part on the comparison.

2. The computer-implemented method of claim 1, further comprising:

determining that the number of available allocation units in the delayed allocation pool is below a threshold; and in response to determining that the number of available allocation units in the delayed allocation pool is below the threshold, replenishing the delayed allocation pool by delegating additional allocation units on the storage cluster to the delayed allocation pool.

3. The computer-implemented method of claim 1, further comprising:

determining that the number of available allocation units in the delayed allocation pool is below a threshold;

determining that the number of available allocation units on the storage cluster is below an available unit threshold; and in response to determining that the number of available allocation units on the storage cluster is below the available unit threshold:

identifying at least one additional node attached to the storage cluster with allocation units on the storage cluster delegated to the additional node;

revoking the delegation of a subset of the allocation units delegated to the additional node; and delegating the subset of allocation units to the delayed allocation pool.

4. The computer-implemented method of claim 1, further comprising:

determining that the number of available allocation units in the delayed allocation pool is below a threshold;

determining that the number of available allocation units on the storage cluster is below an available unit threshold; and in response to determining that the number of available allocation units on the storage cluster is below the available unit threshold, reporting that additional allocation units cannot be delegated to the delayed allocation pool.

5. The computer-implemented method of claim 1, wherein the allocation units are delegated to be held as the delayed allocation pool in response to at least one of:

a file system mount event;

a node join event; and a first delayed allocation event.

6. The computer-implemented method of claim 1, wherein the number of allocation units in the delayed allocation pool is determined at least in part by the number of available allocation units in the storage cluster.

7. The computer-implemented method of claim 1, wherein adjusting the number of allocation units in the delayed allocation pool by delegating additional allocation units to the delayed allocation pool or relinquishing a delegation of allocation units to the delayed allocation pool is further based at least in part on at least one of:

a rate of allocation of allocation units in the delayed allocation pool;

a ratio of the node's allocation request rate to an allocation request rate for at least one additional node attached to the storage cluster;

a ratio of the node's allocation request rate to a number of allocation units allocated to the node, but not in the delayed allocation pool; and a ratio of the node's allocation request rate to a number of available allocation units on the storage cluster.

8. The computer-implemented method of claim 1, wherein the allocation request is satisfied by allocating allocation units delegated to the node, but not included in the delayed allocation pool.

9. The computer-implemented method of claim 1, wherein the delegation of allocation units to the delayed allocation pool is made from a process executing at a lower priority than a priority of a process servicing allocation requests from the node.

10. A system for delayed allocation in cluster storage, the system comprising:

a delegation module, stored in memory, that delegates, to a node attached to a storage cluster comprising at least one storage device that comprises a plurality of allocation units, a subset of the allocation units on the storage cluster to be held as a delayed allocation pool;

a communication module, stored in memory, that receives, from the node, a request to allocate a number of allocation units on the storage cluster;

an adjustment module, stored in memory, that deducts the number of allocation units from a number of available allocation units in the delayed allocation pool, wherein the adjustment module:

maintains, for the node, a measurement of a rate at which the node requests allocation units on the storage cluster;

compares the allocation request rate for the node to the number of allocation units held in the delayed allocation pool; and adjusts the number of allocation units in the delayed allocation pool by delegating additional allocation units to the delayed allocation pool or relinquishing a delegation of allocation units to the delayed allocation pool based at least in part on the comparison;

an allocation module, stored in memory, that satisfies the allocation request by allocating allocation units not included in the delayed allocation pool before allocating allocation units included in the delayed allocation pool, wherein the adjustment module recalculates, based on the number of allocation units in the delayed allocation pool used to satisfy the allocation request, the number of available allocation units in the delayed allocation pool; and at least one physical processor configured to execute the delegation module, the communication module, the adjustment module, and the allocation module.

11. The system of claim 10, wherein the adjustment module:

determines that the number of available allocation units in the delayed allocation pool is below a threshold; and in response to determining that the number of available allocation units in the delayed allocation pool is below the threshold, replenishes the delayed allocation pool by delegating additional allocation units on the storage cluster to the delayed allocation pool.

12. The system of claim 10, wherein the adjustment module:

determines that the number of available allocation units in the delayed allocation pool is below a threshold;

determines that the number of available allocation units on the storage cluster is below an available unit threshold; and in response to determining that the number of available allocation units on the storage cluster is below the available unit threshold:
identifies at least one additional node attached to the storage cluster with allocation units on the storage cluster delegated to the additional node;
revokes the delegation of a subset of the allocation units delegated to the additional node; and
delegates the subset of allocation units to the delayed allocation pool.

13. The system of claim 10, wherein the adjustment module:
determines that the number of available allocation units in the delayed allocation pool is below a threshold;
determines that the number of available allocation units on the storage cluster is below an available unit threshold; and
in response to determining that the number of available allocation units on the storage cluster is below the available unit threshold, reports that additional allocation units cannot be delegated to the delayed allocation pool.

14. The system of claim 10, wherein the delegation module delegates the allocation units to be held as the delayed allocation pool in response to at least one of:
a file system mount event;
a node join event; and
a first delayed allocation event.

15. The system of claim 10, wherein the number of allocation units the delegation module delegates to the delayed allocation pool is determined at least in part by the number of available allocation units in the storage cluster.

16. The system of claim 10, wherein the adjustment module:
adjusts the number of allocation units in the delayed allocation pool by delegating additional allocation units to the delayed allocation pool or relinquishing a delegation of allocation units to the delayed allocation pool further based at least in part on at least one of:
a rate of allocation of allocation units in the delayed allocation pool;
a ratio of the node's allocation request rate to an allocation request rate for at least one additional node attached to the storage cluster;
a ratio of the node's allocation request rate to a number of allocation units allocated to the node, but not in the delayed allocation pool; and
a ratio of the node's allocation request rate to a number of available allocation units on the storage cluster.

17. The system of claim 10, wherein the allocation module satisfies the allocation request by allocating allocation units delegated to the node, but not included in the delayed allocation pool.

18. The system of claim 10, wherein the adjustment module delegates allocation units to the delayed allocation pool from a process executing at a lower priority than a priority of a process servicing allocation requests from the node.

19. A non-transitory computer-readable medium comprising one or more computer-readable instructions that, when executed by at least one processor of a computing device, cause the computing device to:
delegate, to a node attached to a storage cluster comprising at least one storage device that comprises a plurality of allocation units, a subset of the allocation units on the storage cluster to be held as a delayed allocation pool;
receive, from the node, a request to allocate a number of allocation units on the storage cluster;
deduct the number of allocation units from a number of available allocation units in the delayed allocation pool;
satisfy the allocation request by allocating allocation units not included in the delayed allocation pool before allocating allocation units included in the delayed allocation pool;
recalculate, based on the number of allocation units in the delayed allocation pool used to satisfy the allocation request, the number of available allocation units in the delayed allocation pool;
maintain, for the node, a measurement of a rate at which the node requests allocation units on the storage cluster;
compare the allocation request rate for the node to the number of allocation units held in the delayed allocation pool; and
adjust the number of allocation units in the delayed allocation pool by delegating additional allocation units to the delayed allocation pool or relinquishing a delegation of allocation units to the delayed allocation pool based at least in part on the comparison.

20. The non-transitory computer-readable medium of claim 19, wherein the one or more computer-readable instructions cause the computing device to:
determine that the number of available allocation units in the delayed allocation pool is below a threshold; and
in response to determining that the number of available allocation units in the delayed allocation pool is below the threshold, replenish the delayed allocation pool by delegating additional allocation units on the storage cluster to the delayed allocation pool.

* * * * *

UNITED STATES PATENT AND TRADEMARK OFFICE
CERTIFICATE OF CORRECTION

PATENT NO. : 10,248,557 B1
APPLICATION NO. : 15/266251
DATED : April 2, 2019
INVENTOR(S) : Freddy James et al.

Page 1 of 1

It is certified that error appears in the above-identified patent and that said Letters Patent is hereby corrected as shown below:

On the Title Page

In Column 1, item (72), Inventors, Line 1, delete "Kerela" and insert -- Kerala --, therefor.

Signed and Sealed this
Fourth Day of June, 2019

Andrei Iancu
*Director of the United States Patent and Trademark Office*